UNITED STATES PATENT OFFICE.

WILHELM HERZBERG, OF BERLIN, AND OSWALD SCHARFENBERG, OF SCHÖNEBERG, NEAR BERLIN, GERMANY, ASSIGNORS TO ACTIEN GESELLSCHAFT FÜR ANILIN FABRIKATION, OF BERLIN, GERMANY.

TRIPHENYLMETHAN DYE AND PROCESS OF MAKING SAME.

No. 866,359.   Specification of Letters Patent.   Patented Sept. 17, 1907.

Application filed March 28, 1907. Serial No. 365,206.

*To all whom it may concern:*

Be it known that we, WILHELM HERZBERG and OSWALD SCHARFENBERG, subjects of the Emperor of Germany, residing at Berlin, Germany, Hagelsbergerstrasse 10°, respectively, Schöneberg, near Berlin, Wartburgstrasse 9, have invented certain new and useful Improvements in Triphenylmethan Dyes and Processes of Making the Same, of which the following is a specification.

Our present invention relates to the manufacture of valuable dyestuffs of the triphenylmethan series, which dye wool in an acid bath clear green shades, by condensing an alkylbenzylanilin sulfonic acid with an arylsulfonic ether of an ortho-oxy-aldehyde of the general formula:

$$R_1.C_6H_3.CHO.OR,$$
$$\quad (1)\quad (2)$$

in which $R_1$ means a hydrogen atom or an alkyl group such as methyl or ethyl or another radical such as for instance chlorin, whereas R means the residue of an arylsulfonic acid such as for instance $SO_2.C_6H_5$ or $SO_2.C_6H_4.CH_3$, and then oxidizing the intermediate leuco-compound. Thus for instance we condense the para-toluene sulfonic ether of salicyl aldehyde:

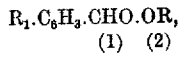

with benzyl ethyl anilin sulfonic acid and by oxidizing the leuco-compound formed we obtain a dyestuff which dyes wool in an acid bath a clear green tint which possesses a good fastness to washing.

For the condensing process any suitable condensing agent, such as, for instance, sulfuric acid may be used; and for oxidizing the new intermediate leuco-compound to the dyestuff, any suitable oxidizing agent may be employed.

As to the production of the arylsulfonic ethers of the above given general formula i. e. of the arylsulfonic ethers of salicyl aldehyde or of a homologue or a derivative thereof such ethers may be obtained by acting with an arylsulfonic chlorid: $R.SO_2.Cl$ upon the aqueous solution of the sodium or potassium salt of the oxy-aldehyde in question preferably while heating and agitating well. The production of such an ether may for instance be as follows: 25 parts of salicyl aldehyde are dissolved in 250 parts of hot water by means of 24 parts of caustic soda lye (40° Baumé specific gravity); while agitating well one adds 50 parts of para-toluene sulfochlorid $CH_3.C_6H_4.SO_2.Cl$ (containing about 80 per cent of pure substance), the temperature being kept at 70 to 80° C. The reaction is finished if the yellow solution has decolorized, the chlorid then being absorbed. The mass is allowed to cool while stirring well, thus the reaction product, which previously separates in a resinous form, solidifying to small white spheres. It is isolated by filtering, washing and drying.

According to the above given method of preparing the para-toluene sulfonic ether of salicyl aldehyde the corresponding ethers of a homologue or of derivatives of salicyl aldehyde can be obtained. In the following table the characteristic features of some of these new compounds may be seen.

| Body. | Formula. | Melts at | Crystallizes from ligroin in |
|---|---|---|---|
| P-toluenesulfo-salicyl-aldehyde. |  | 59-60° | Prisms arranged in star-like bundles. |
| P-toluenesulfo-o-homosalicyl-aldehyde. |  | 62° | Rhomb-like small leaves. |
| P-toluenesulfo-p-homosalicyl-aldehyde. |  | 68-69° | Needles arranged in bundles. |
| Benzenesulfo-p-homosalicyl-aldehyde. |  | 63° | Rectangular plates. |

These products are insoluble in cold water and very difficultly soluble in boiling water.

Now in carrying out the process which forms the subject matter of our present invention, the following examples may be given, the parts being by weight.

*Example.* Dyestuff derived from the para-toluene-sulfonic ether of salicyl aldehyde and ethylbenzyl-anilinsulfonic acid. In a mixture of 90 parts of water and 100 parts of alcohol are dissolved 28 parts of para-toluenesulfosalicyl aldehyde and 58.2 parts of ethyl-benzylanilinsulfonic acid with the addition of 10 parts of concentrated sulfuric acid; the mass is then heated to boiling until the aldehyde has disappeared. After distilling off the alcohol, the residue is poured into 500 parts of water whereby the product of the reaction, namely the leucodisulfonic acid is separated, while the mixture is hot, as a white resin, which on cooling solidifies in a short time. In order to oxidize the leuco-disulfonic acid thus obtained, 84 parts of it are dissolved in about 1600 parts of water with aid of 11 parts of calcined sodium carbonate; to this solution are added while stirring well 75 parts of a paste of lead peroxid, containing 33 per cent of $PbO_2$, whereafter 90 parts of acetic acid (30% strength) are allowed to run in. The oxidation being finished, the lead is separated from the solution by addition of the calculated quantity of sulfuric acid; after filtration the dyestuff is separated from the filtrate by addition of Glauber's salt. It is filtered and dried. The new dyestuff is thus obtained in the form of a mass having a coppery luster it dyes wool in an acid bath clear green tints which are satisfactorily fast to washing.

It is obvious that our present invention is not limited to the foregoing example or to the details given therein. For instance if in the foregoing example instead of the ether of salicyl aldehyde the para-toluenesulfonic ether of para-homosalicylaldehyde (compare 3 in the foregoing table) is used and if the process is carried out in the manner described in the foregoing example, a dyestuff is obtained which resembles very much the dyestuff obtained according to this example. It yields on wool in an acid bath green tints which are somewhat more yellow than those obtained with the dyestuff of the foregoing example. Furthermore if the para-toluene-sulfonic ether of orthohomosalicyl aldehyde (compare 2 in the foregoing table), be converted into a leuco-disulfonic acid by joint oxidation with ethyl-benzyl-anilinsulfonic acid and the leuco-compound be oxidized to the dyestuff, a dyestuff is obtained which also dyes wool in an acid bath green tints. It may also be stated that the dyestuffs which can be obtained according to the present invention very much resemble each other in their physical and chemical qualities. In water they dissolve to a green solution; in alcohol they are soluble partially in the cold and totally on boiling, the solution thus obtained showing a green tint. On addition of caustic soda lye or hydrochloric acid to the aqueous solution green flakes separate. In concentrated sulfuric acid the dyestuffs dissolve to a yellow-brown solution, the color of which on addition of ice turns to green.

It is obvious that instead of the paratoluenesulfonic ether other aryl-sulfonic ethers, such as for instance the ethers of benzene-sulfonic acid may be used; likewise, for the ethylbenzylanilinsulfonic acid, used in the foregoing example methylbenzylanilin-sulfonic acid may be substituted. Furthermore, the condensation of the arylsulfonic ethers of the salicyl aldehydes with an alkylbenzylanilin-sulfonic acid, as well as the oxidation of the leucodisulfonic acids to the corresponding dyestuffs may be effected by any suitable condensing or oxidizing agent respectively other than those mentioned in the foregoing examples.

Now what we claim is:

1. The hereinbefore described process of making new dyestuffs of the triphenylmethan series, which process consists in condensing an alkylbenzylanilin sulfonic acid with an arylsulfonic ether of an oxyaldehyde having the general formula

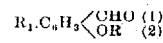

defined in the foregoing specification to form a leuco-disulfonic acid, and then oxidizing the intermediate leuco compound.

2. As new articles of manufacture the new dyestuffs of the triphenylmethan series which may be obtained by condensing an alkylbenzylanilin sulfonic acid with an arylsulfonic ether of an oxyaldehyde having the general formula

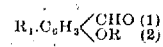

defined in the foregoing specification and then oxidizing the intermediate leuco-compound, which dyestuffs dye wool in an acid bath clear green tints which are satisfactorily fast to washing, these dyestuffs dissolving in water to a green solution, from which solution on addition of caustic soda lye or of hydrochloric acid green flakes separate, and being soluble in alcohol namely partially in the cold and totally on boiling, the solution thus obtained showing a green tint, and which dyestuffs in concentrated sulfuric acid dissolve to a yellow-brown solution, the color of which on addition of ice turns to green.

3. As a new article of manufacture the new dyestuff of the triphenylmethan series which may be obtained by condensing ethylbenzylanilin sulfonic acid with the paratoluenesulfonic ether of salicyl aldehyde and oxidizing the intermediate leuco-compound, which dyestuff dyes wool in an acid bath a clear green tint which is satisfactorily fast to washing, this dyestuff dissolving in water to a green solution from which solution on addition of caustic soda lye or of hydrochloric acid green flakes separate, and this dyestuff being soluble in alcohol, namely partially in the cold and totally on boiling, the solution thus obtained showing a green tint, and which dyestuff in concentrated sulfuric acid dissolves to a yellow-brown solution, the color of which on addition of ice turns to green.

In testimony whereof we have hereunto set our hand in presence of two subscribing witnesses.

WILHELM HERZBERG.
OSWALD SCHARFENBERG.

Witnesses:
WOLDEMAR HAUPT,
HENRY HASPER.